United States Patent [19]
Sakairi

[11] Patent Number: 6,009,260
[45] Date of Patent: Dec. 28, 1999

[54] EMULATION DEVICE WITH NO FEAR OF FAULTY OPERATION DUE TO NOISE

[75] Inventor: Tetsuya Sakairi, Tokyo, Japan

[73] Assignee: NEC Corporation, Tokyo, Japan

[21] Appl. No.: 08/890,051

[22] Filed: Jul. 9, 1997

[30] Foreign Application Priority Data

Jul. 9, 1996 [JP] Japan ................................ 8-179181

[51] Int. Cl.⁶ .................................................. G06F 9/455
[52] U.S. Cl. ................................ 395/500.44; 395/500.45
[58] Field of Search ................. 395/500, 500.44–500.49

[56] References Cited

U.S. PATENT DOCUMENTS

| | | | |
|---|---|---|---|
| 5,056,033 | 10/1991 | Hill | 364/483 |
| 5,367,436 | 11/1994 | Ikei | 361/766 |
| 5,375,228 | 12/1994 | Leary et al. | 395/575 |
| 5,383,137 | 1/1995 | Burch | 364/578 |
| 5,526,275 | 6/1996 | Enomoto | 364/488 |
| 5,539,901 | 7/1996 | Ramirez | 395/500.49 |
| 5,546,566 | 8/1996 | Katsuta | 395/500 |
| 5,581,695 | 12/1996 | Knoke et al. | 395/183.04 |
| 5,630,102 | 5/1997 | Johnson et al. | 395/500.49 |
| 5,655,111 | 8/1997 | Uegaki | 395/500.49 |
| 5,717,699 | 2/1998 | Haag et al. | 371/22.2 |
| 5,743,748 | 4/1998 | Takahata et al. | 439/71 |

FOREIGN PATENT DOCUMENTS

| | | |
|---|---|---|
| 2-9937 | 1/1990 | Japan . |
| 8-147185 | 6/1996 | Japan . |

*Primary Examiner*—Kevin J. Teska
*Assistant Examiner*—Kyle J. Choi
*Attorney, Agent, or Firm*—Foley & Lardner

[57] ABSTRACT

In an emulation device comprising an emulation unit having a debugging function and a probe for use in connecting the emulation unit with a target system, the probe comprises a cable assembly for use in connecting it to the emulation unit and a probe connector having an analog circuit to emulate at least a part of functions of the target system. A power supply and a ground for the analog circuit are connected to an external system via a first power supply line and a first ground line, respectively, that are independent of the cable assembly.

4 Claims, 6 Drawing Sheets

EMULATION DEVICE WITH NO FEAR OF FAULTY OPERATION DUE TO NOISE

BACKGROUND OF THE INVENTION

The present invention relates to an emulation device comprising an emulation unit having a debugging function and a probe having a function to emulate at least a part of functions of a target system. More specifically, the present invention relates to an improvement of such an emulation device that has an analog circuit in the probe.

Emulation devices of the type described are used for an application system with a microcomputer that is to be designated as a target system to debug hardware and software of the target system under the control of a control device. The emulation device comprises an emulation unit and a probe. The probe has a relatively long cable assembly for use in connecting it to the emulation unit. The cable assembly is provided with a probe connector at an end thereof. The probe connector has an integrated circuit for use in emulating peripheral functions of the microcomputer. This integrated circuit is called a peripheral evaluation chip and has digital and analog circuits. The peripheral evaluation chip is connected to the emulation unit and the target system via a power supply line and a ground line contained in the cable assembly.

The emulation unit comprises a plurality of integrated circuits (ICs) such as large-scale integrated circuits (LSIs). The emulation unit is thus affected by instantaneous change in an internal signal in ICs as well as by the impedance of the power supply line and the ground line. As a result, power supply noise may be generated on the power supply line and the ground line. In addition, the cable assembly may serve as an antenna because it is relatively long. This may cause electro-magnetically induced noise on the cable assembly. Such power supply noise or electro-magnetically induced noise affects the peripheral evaluation chip through the power supply line and the ground line. If it happens, the analog circuit contained in the peripheral evaluation chip may be operated in a wrong or false manner.

SUMMARY OF THE INVENTION

Therefore, an object of the present invention is to provide an emulation device with no fear of faulty operation which otherwise is caused due to power supply noise or electro-magnetically induced noise.

An emulation device according to the present invention comprises an emulation unit having a debugging function and a probe for use in connecting the emulation unit with a target system. The probe comprises a cable assembly for use in connecting it to the emulation unit and a probe connector having an analog circuit to emulate at least a part of functions of the target system.

According to an aspect of the present invention, a power supply and a ground for the analog circuit are connected to an external system via a first power supply line and a first ground line, respectively, that are independent of the cable assembly.

DESCRIPTION OF THE PREFERRED EMBODIMENT

Referring to FIGS. 1 through 4, a conventional emulation device is described for the purpose of facilitating the understanding of the present invention.

Figure 1:
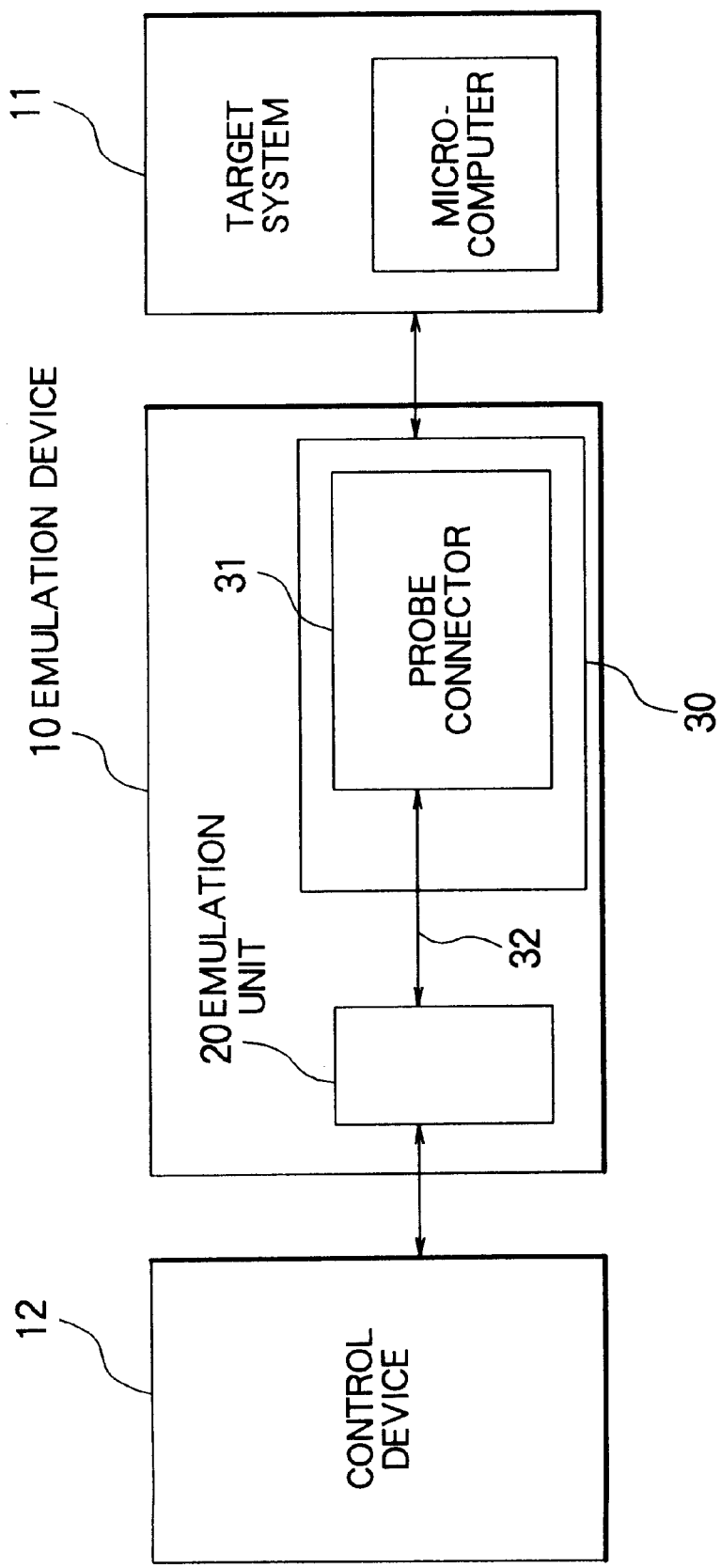
FIG. 1 is a view illustrating an exemplified connection of an emulation device with a control device and a target system.

In FIG. 1, an emulation device 10 is used for an application system with a microcomputer that is to be designated as a target system 11 to debug hardware and software of the target system 11 under the control of a control device 12. The emulation device 10 comprises an emulation unit 20 and a probe 30. The probe 30 is for use in connecting the emulation unit 20 to the target system 11. The probe 30 has a probe connector 31 and a cable assembly 32 for use in connecting the emulation unit 20 with the probe connector 31. In other words, the probe connector 31 is provided at an end of the cable assembly 32. The probe connector 31 has an integrated circuit for use in emulating peripheral functions of the microcomputer in the target system 11. This integrated circuit is referred hereinafter as a peripheral evaluation chip.

Figure 2:
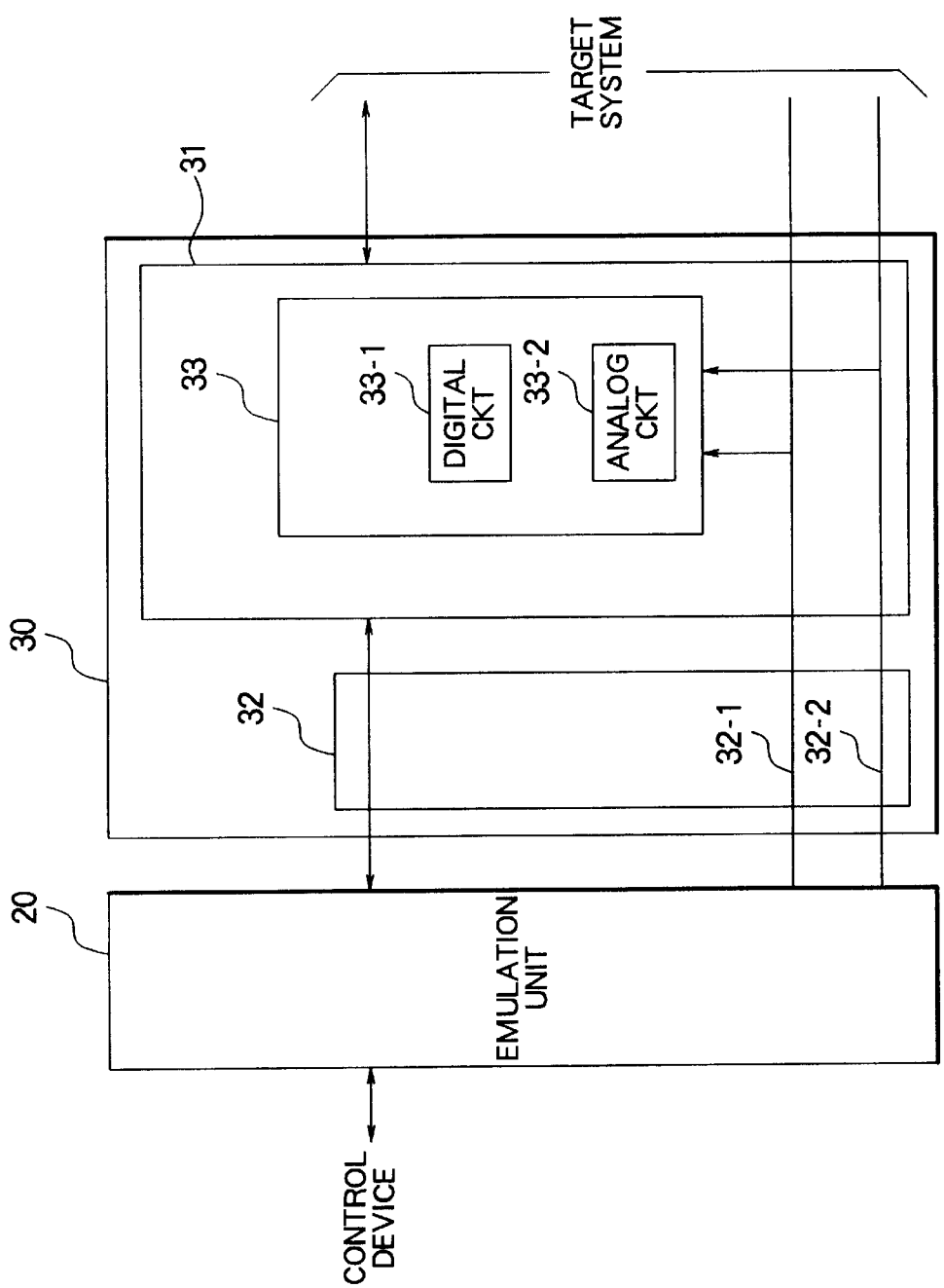
FIG. 2 is a block diagram showing a structure of a conventional emulation device.

In FIG. 2, the emulation unit 20 carries out operations of a central processing unit (CPU) of the microcomputer in the target system 11 and complementary operations for debugging hardware and software of the target system 11. The cable assembly 32 is an assembly of lines including a power supply line 32-1 and a ground line 32-2. The power supply line 32-1 and the ground line 32-2 are each connected to the target system 11 and supply electric power to a peripheral evaluation chip 33 that is mounted on the probe connector 31.

The peripheral evaluation chip 33 on the probe connector 31 is an integrated circuit adapted to emulate peripheral functions of the microcomputer in the target system 11. The peripheral evaluation chip 33 is provided with the power from both the emulation unit 20 and the target system 11 via the power supply line 32-1. The ground line 32-2 is used to connect the emulation unit 20 with the target system 11. This peripheral evaluation chip 33 typically contains a digital circuit 33-1 and an analog circuit 33-2.

The emulation unit 20 comprises a plurality of integrated circuits (ICs) such as large-scale integrated circuits (LSIs). The emulation unit 20 is thus affected by instantaneous change in an internal signal in ICs as well as by the impedance of the power supply line 32-1 and the ground line 32-2. As a result, power supply noise is generated on the power supply line 32-1 and the ground line 32-2. In addition, the cable assembly 32 may serve as an antenna because it is relatively long. This causes electro-magnetically induced noise on the cable assembly 32. Such power supply noise or electro-magnetically induced noise affects the peripheral evaluation chip 33 on the probe connector 31 through the cable assembly 32. If it happens, the analog circuit 33-2 contained in the peripheral evaluation chip 33 may be operated in a wrong or false manner due to the power supply noise or the electro-magnetically induced noise.

Figure 3:
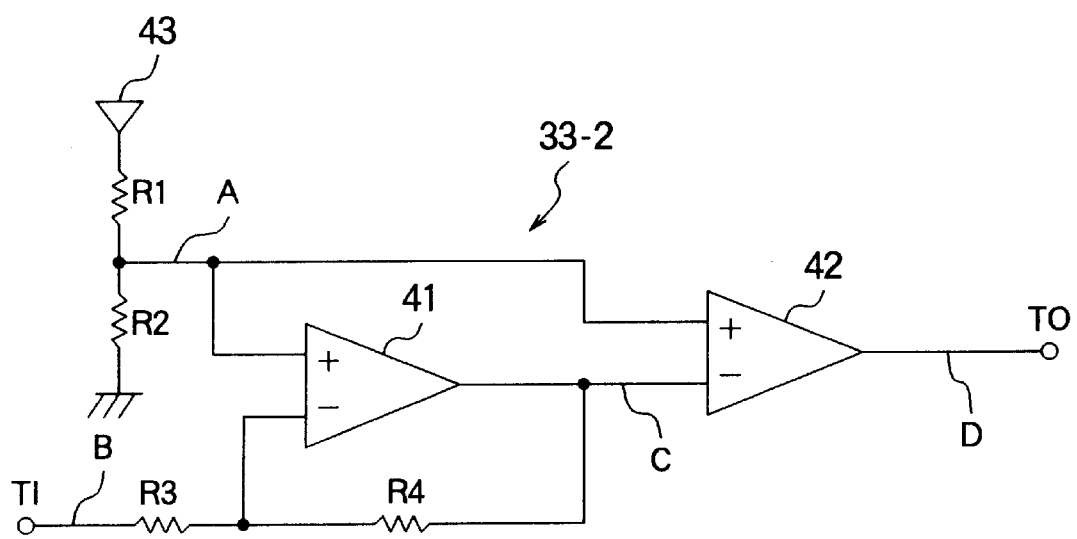
FIG. 3 is a circuit diagram of an exemplified analog circuit provided in a peripheral evaluation chip illustrated in FIG. 2.

Effects of the power supply noise or the electro-magnetically induced noise in the analog circuit 33-2 are described with reference to FIGS. 3 and 4. In FIG. 3, the analog circuit 33-2 comprises an operational amplifier 41, a comparator 42, resistors R1 and R2 for dividing voltage, a resistor R3 for signal input, and a feedback resistor R4. Power is supplied to the analog circuit 33-2 from a power supply 43 through the resistor R1. The analog circuit 33-2 reverse-amplifies at the operational amplifier an analog micro-signal received by an input terminal T1. An output of the operational amplifier 41 is converted into a digital signal by the comparator 42 and is produced through an output terminal T0.

Figure 4A:
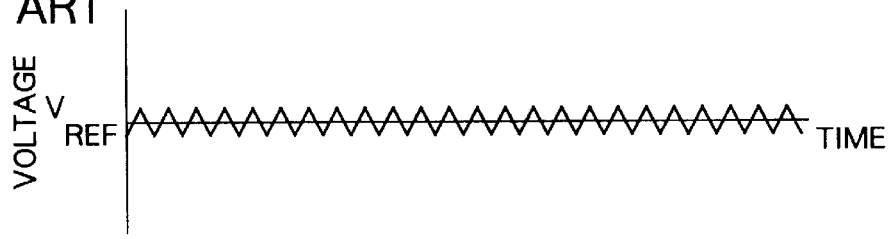
FIGS. 4A through 4D show a waveform chart for use in describing effects of noise generated in an analog circuit illustrated in FIG. 3.

A reference voltage $V_{REF}$ is generated by dividing the voltage of the power supply 43 by the use of the resistors R1 and R2. This reference voltage $V_{REF}$ is applied to a point A at positive input terminals of the operational amplifier 41 and the comparator 42. As shown in FIG. 4A, unstable, small waves are added to the reference voltage $V_{REF}$ due to the power supply noise or the electro-magnetically induced noise.

Figure 4B:
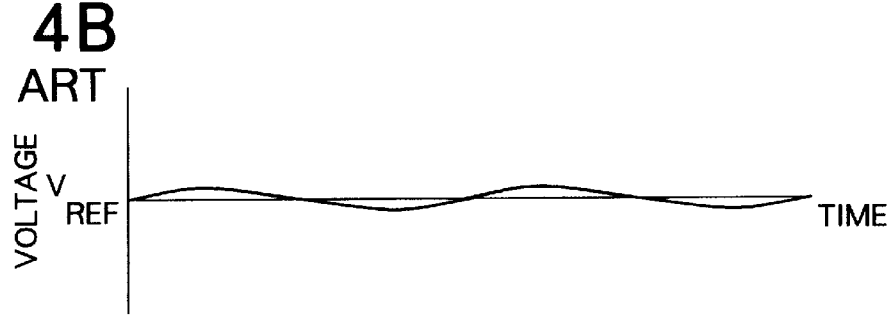
Figure 4C:
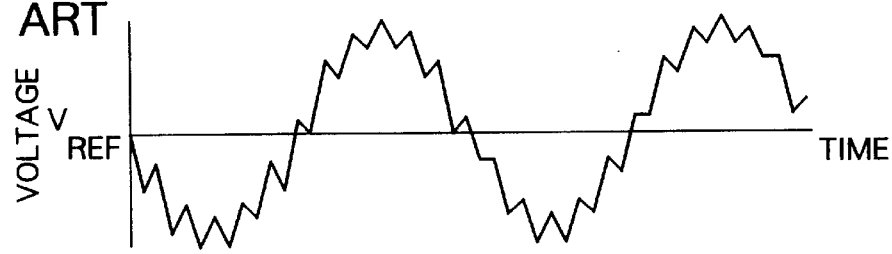
Figure 4D:
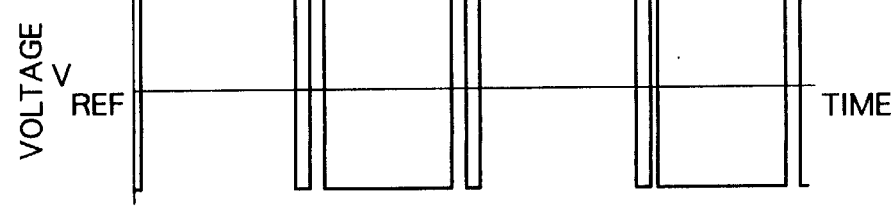

It is assumed that the input signal indicated in FIG. 4B is supplied to a point B on the input terminal TI. In such a case, the input signal is supplied to a negative input terminal of the operational amplifier 41 through the resistor R3 and is reverse-amplified by the operational amplifier 41. However, the reverse-amplified signal exhibits a waveform of the amplified signal with unstable, small waves added thereto as shown in FIG. 4C. The reference signal $V_{REF}$ indicated in FIG. 4A is responsible for it. The output of the operational amplifier 41 is supplied to the negative input terminal of the comparator 42. As a result, the digital output signal obtained over a point D on the output terminal T0 of the comparator 42 has bread-shaped pulses with small waves at the edge of the waveform of the pulse, as shown in FIG. 4D. The bread-shaped pulses would cause faulty operation of the emulation device.

Two conventional approaches to the above mentioned problems are described. A first one is to prevent the aforementioned power supply noise from entering the analog circuit 33-2 in the peripheral evaluation chip 33. In other words, this approach lies in avoiding generation of any power supply noise in the emulation device unit.

This first approach lowers the impedance across the power supply and the ground by means of increasing the thickness of wiring patterns of the power supply and the ground printed on a printed wiring board on which the ICs in the emulation unit are mounted. It is thus necessary to further increase the thickness of the wiring patterns of the power supply and the ground when high-frequency noise should be removed. This in turn requires increasing the size of the printed wiring board. To increase the size of the printed wiring board requires extra costs. In addition, there is a limitation on the size of the printed wiring board.

A second approach uses a bypass capacitor. More specifically, a capacitor is connected between the power supply line and the ground line of the analog circuit 33-2 in the peripheral evaluation chip 33. This second approach can be realized easily but the type of the capacitor used is the limitation on the frequency of the power supply noise that the capacitor can remove.

Figure 5:
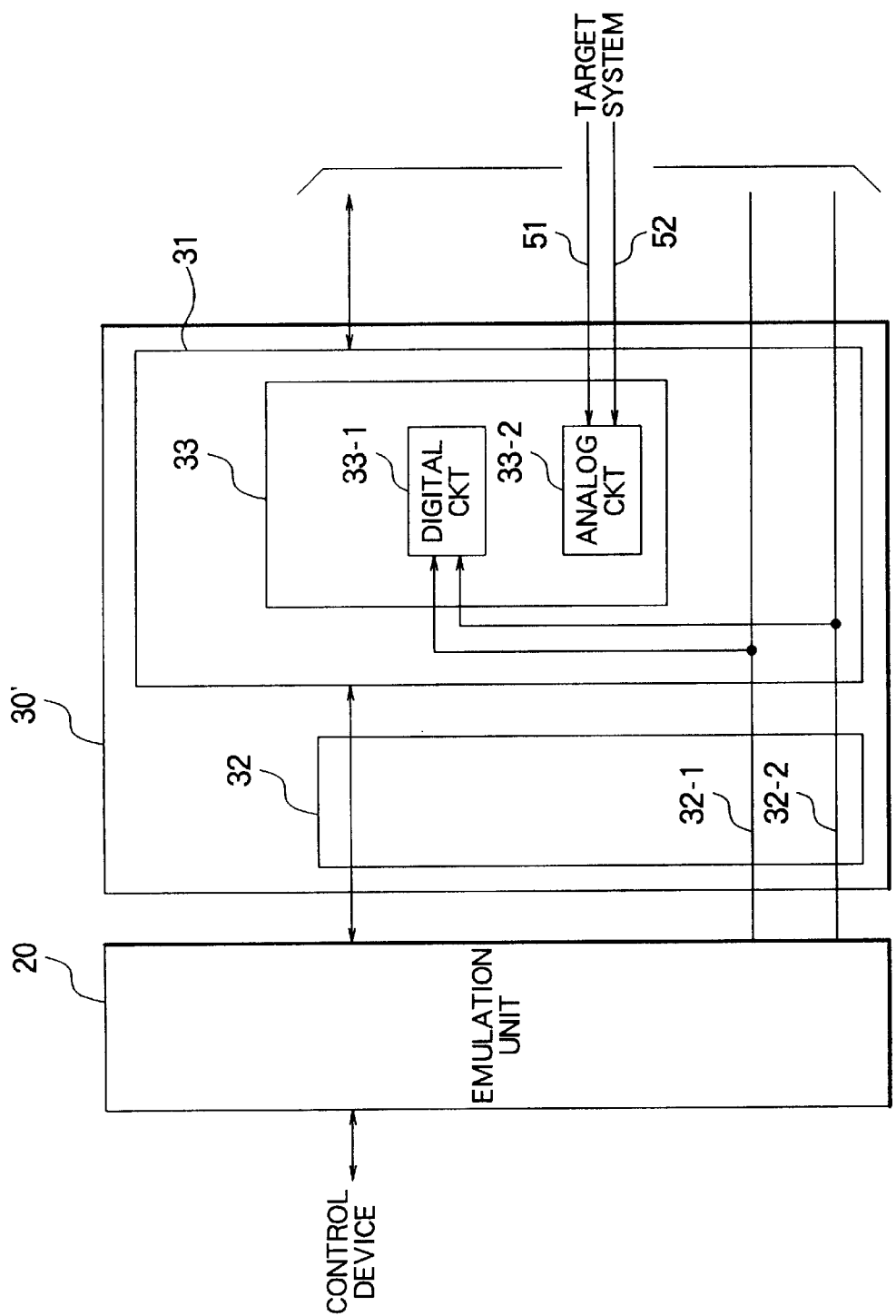
FIG. 5 is a block diagram showing a structure of an emulation device according to a preferred embodiment of the present invention.

Referring to FIGS. 5 and 6, an emulation device according to a preferred embodiment of the present invention is described. The emulation device according to the present invention is connected between the control device 12 and the target system 11 as described in conjunction with FIG. 1. A feature of the emulation device according to the present invention lies in the connection between the analog circuit 33-2 in the peripheral evaluation chip 33 on a probe 30' with the power supply line and the ground line. More specifically, the analog circuit 33-2 is connected to the target system 11 via a power supply line 51 and a ground line 52 to receive power from the target system 11. The power supply line 51 and the ground line 52 are independent of the power supply line 32-1 and the ground line 32-2, respectively, described in conjunction with FIG. 2.

The emulation unit 20 is controlled by the control device 12 and serves as a CPU of the microcomputer in the target system 11 to be emulated. The emulation unit 20 thus operates the target system 11.

As described above, the probe 30' connects the emulation unit 20 and the target system 11. The probe 30' comprises the probe connector 31 and the cable assembly 32. The cable assembly 32 is a set of lines including the power supply line 32-1 and the ground line 32-2. The probe connector 31 is provided with the peripheral evaluation chip 33 mounted thereon. The peripheral evaluation chip 33 is an integrated circuit that is used to emulate peripheral functions of the microcomputer in the target system 11. The peripheral evaluation chip 33 comprises the digital circuit 33-1 and the analog circuit 33-2.

The power supply line and the ground line for the digital circuit 33-1 and the analog circuit 33-2 in the peripheral evaluation chip 33 are different from those in the conventional peripheral evaluation chip. The power supply lines and the ground lines of this invention are independent of each other in the peripheral evaluation chip 33. The digital circuit 33-1 is connected to both the emulation unit 20 and the target system 11 through the power supply line 32-1 and the ground line 32-2. The analog circuit 33-2 is connected to the target system 11 through the power supply line 51 and the ground line 52, that are independent of the power supply line 32-1 and the ground line 32-2, respectively.

The power supply line 51 and the ground line 52 connected to the analog circuit 33-2 are short unlike the long cable assembly 32 in the probe 30'. Therefore, no electro-magnetically induced noise is generated. In addition, the circuit in the target system 11 is significantly small in size than the circuit in the emulation unit 20, so that the power supply noise is hardly generated. This means that the analog circuit 33-2 is not affected by the power supply noise, avoiding the faulty operation of the emulation device which otherwise may be caused due to the power supply noise.

In FIG. 6, the analog circuit 33-2 illustrated in FIG. 3 operates as follows with the emulation device according to the present invention.

Figure 6A:
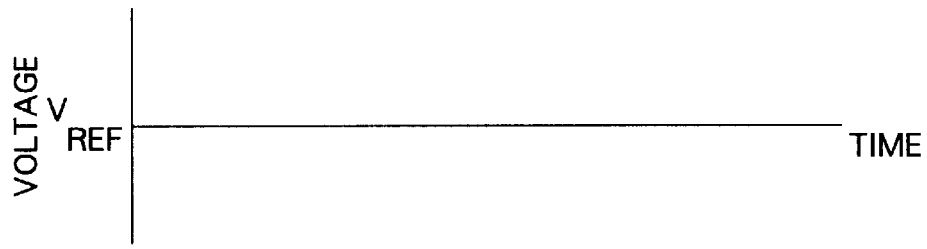
FIGS. 6A through 6D show a waveform chart for use in describing operation of an analog circuit provided in a peripheral evaluation chip illustrated in FIG. 5.
Figure 6B:
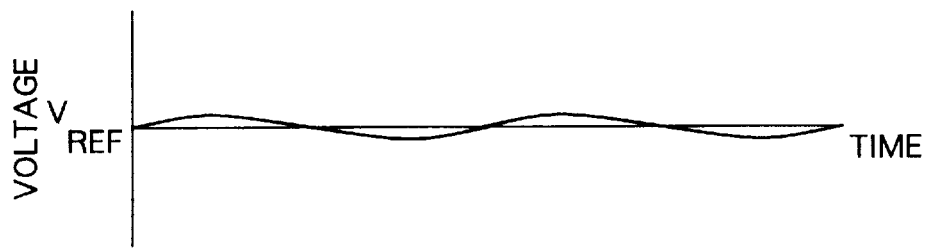
Figure 6C:
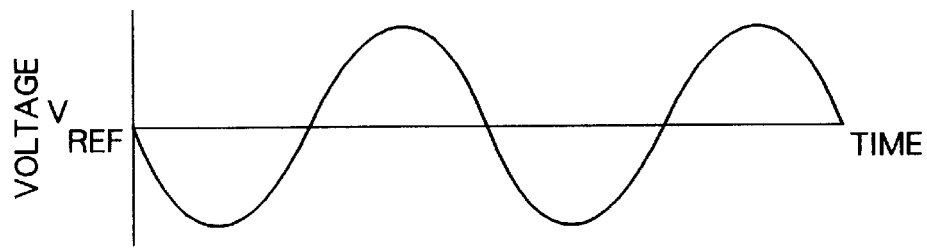
Figure 6D:
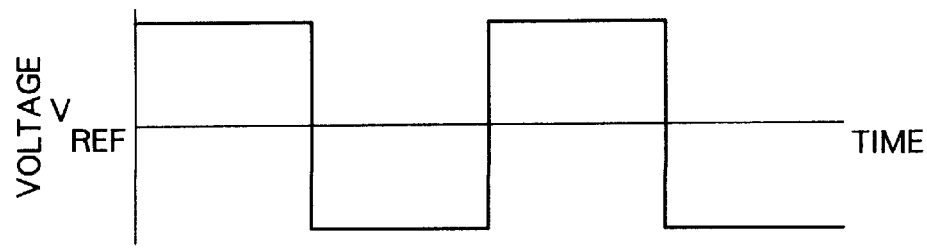

The reference voltage $V_{REF}$ is generated by dividing the voltage of the power supply 43 by the use of the resistors R1 and R2. This reference voltage $V_{REF}$ is applied to the point A at positive input terminals of the operational amplifier 41 and the comparator 42. The reference voltage $V_{REF}$ has a constant value as shown in FIG. 6A because no electro-magnetically induced noise exists. It is assumed that the input signal indicated in FIG. 6B is supplied to the point B on the input terminal TI. In such a case, the input signal is supplied to a negative input terminal of the operational amplifier 41 through the resistor R3 and is reverse-amplified by the operational amplifier 41. The reverse-amplified signal exhibits a stable waveform as shown in FIG. 6C because the reference signal $V_{REF}$ is stable. The output of the operational amplifier 41 is supplied to the negative input terminal of the comparator 42. As a result, the digital output signal obtained over the point D on the output terminal T0 of the comparator 42 has a precise pulsed waveform, as shown in FIG. 6D. The analog circuit 33-2 in the peripheral evaluation chip 33 can operate without any faulty operation.

The above mentioned description has thus been made in conjunction with the case where the analog circuit 33-2 in the peripheral evaluation chip 33 is connected to the target system 11 via the short power supply line 51 and the ground line 52. However, the power supply line 51 and the ground line 52 may be connected to another system such as an independent power supply system rather than the target system 11. In addition, while the description has been made as the emulation unit 20 emulates the CPU of the microcomputer in the target system 11, the identical effect can be made when it is emulated by the peripheral evaluation chip mounted on the probe connector 31 of the peripheral evaluation device.

What is claimed is:

1. An emulation device comprising an emulation unit having a debugging function and a probe for use in connecting the emulation unit with a target system, said probe comprising a cable assembly for use in connecting said target system to said emulation unit and a probe connector including an analog circuit to emulate at least a part of functions of said target system, wherein a power supply and a ground for said analog circuit are connected to said target system via a first power supply line and a first ground line, respectively, that are independent of said cable assembly.

2. An emulation device as claimed in claim 1, wherein said probe connector further comprises a digital circuit to emulate at least a part of functions of said target system, a power supply and a ground of said digital circuit being connected to a second power supply line and a second ground line, respectively that are contained in said cable assembly.

3. An emulation device, comprising:

an emulation unit;

a probe connector containing an analog circuit;

a cable assembly connecting the emulation unit, the probe connector and a target device;

a first power supply line and a first ground line connecting the analog circuit and the target device, wherein the first power supply line and the first ground line are independent of the cable assembly.

4. The emulation device of claim 3, wherein the probe connector contains a digital circuit; and wherein the cable assembly contains a second power supply line and a second ground line connecting the emulation unit, the digital circuit, and the target device.

* * * * *